March 4, 1924.

H. E. HULL 1,485,612

FOOT CONTROL FOR AUTOMOBILES

Filed Oct. 21, 1922

WITNESS
W. A. Williams

INVENTOR
Harry E. Hull.
BY
ATTORNEYS

Patented Mar. 4, 1924.

1,485,612

UNITED STATES PATENT OFFICE.

HARRY E. HULL, OF WILLIAMSBURG, IOWA.

FOOT CONTROL FOR AUTOMOBILES.

Application filed October 21, 1922. Serial No. 596,023.

*To all whom it may concern:*

Be it known that I, HARRY E. HULL, a citizen of the United States, and a resident of Williamsburg, in the county of Iowa and State of Iowa, have invented certain new and useful Improvements in Foot Controls for Automobiles, of which the following is a specification.

My present invention relates generally to the foot controlling devices of automobiles, and more particularly to a safety arrangement of foot controls in conjunction with a foot support having as its object the avoiding of disastrous accidents commonly resulting in cases where it is necessary to quickly shift the foot from one control to another and mistake is made in the particular control either through accident in misplacing the foot or through loss of presence of mind in the emergency.

It is well known that automobile drivers and operators are commonly parties to serious accidents through accidental or unknowing depression of the foot throttle when the brake pedal should have been depressed and my invention seeks to avoid such accidents by avoiding the necessity of quick shifting of the foot and by providing an arrangement whereby the foot may be carried ready for instant engagement with either of two controlling members and whereby either control may be separately actuated without danger of both being depressed at the same time.

Figure 1:
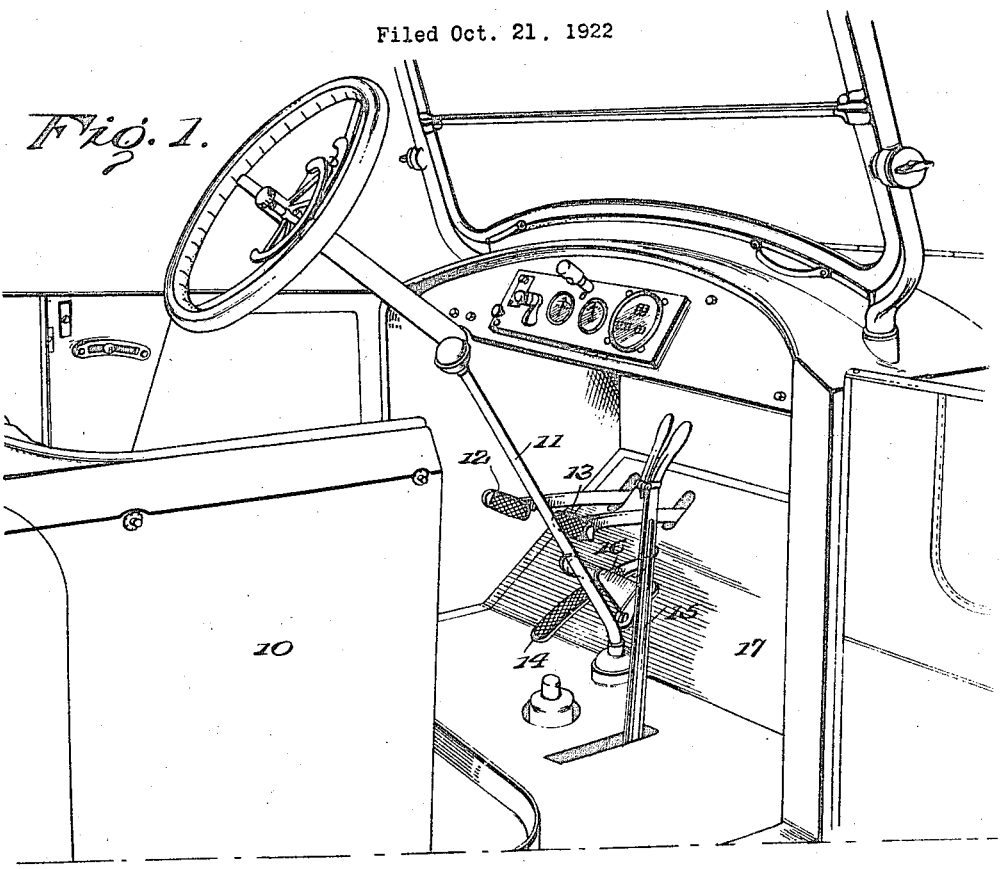
Figure 2:
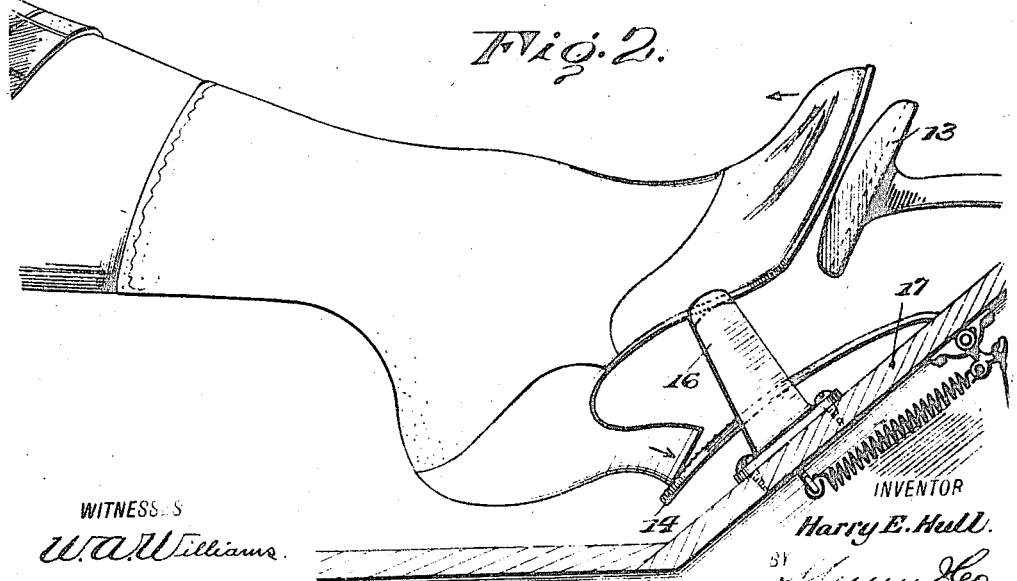

In the accompanying drawing which illustrates my present invention and forms a part of this specification, Figure 1 is a perspective view of a portion of an automobile illustrating the various operating controls, and Figure 2 is a sectional side view illustrating certain of the controls and the foot rest according to the relative arrangement proposed by my invention.

Referring now to these figures and particularly to Figure 1 I have shown an automobile generally indicated at 10, having in front of the driver's seat various control members including a gear shift lever 11, clutch pedal 12, brake pedal 13, accelerator 14 and emergency or hand brake 15, and it is to the brake pedal 13 and accelerator 14 that my improvements are particularly directed as it is a well known fact that serious accidents result in many instances from slipping of the foot off of the brake pedal and upon the accelerator where hasty shifting of the foot to the brake pedal is required and in other cases results from the loss of presence of mind in an emergency and depression of the foot upon the accelerator pedal where the operator erroneously thinks his or her foot is on the brake pedal.

According to my invention I propose the location of these two controlling members, that is the brake pedal 13 and accelerator 14 in longitudinally alined and spaced relation and I propose to mount between these members a foot rest 16 on which the arch of the foot, as particularly seen in Figure 2, may normally rest without active depression of either the foot brake or the accelerator. This foot rest is preferably a rigid angular bracket secured for instance to the floor board 17 of the automobile and having its upper portion extending transversely between the two control members so that it is thus adapted to form a fulcrum on which the foot may pivot either rearwardly for the depression of the accelerator 14 or forwardly for the depression of the foot brake 13, and while these parts might in some instances be reversed, I prefer the location as shown and described which finds the brake pedal 13 below the toe of the foot and the accelerator 14 below the heel. The reason for this is that in almost every emergency application of the brake is preferable and in such emergencies the foot as it is depressed naturally slides forward on the rest 16 with the result that the brake pedal is depressed and it is obvious that as this takes place and the most natural movement of the foot causes the same to rock forwardly, the heel will be shifted upwardly and away from the accelerator and in this way avoid all danger of depression of the latter.

It is also obvious that by this arrangement while the automobile is driven as it normally is by foot regulated pressure upon the accelerator, the foot while in position for practically instantaneous engagement with the brake pedal, is still lifted free from the latter.

It is furthermore to be understood that while my invention is capable of application to the various foot controls, it is more particularly adapted and intended for use in connection with the brake pedal and accelerator, and as so used it is obvious that this method of control enables the driver of an automobile to consistently use the toe for stopping the machine and the heel for sending it forward.

I claim:

1. A safety foot controlling arrangement for automobiles including a foot rest, a toe engaging and depressible control member at the front of the foot rest, a heel engaging and depressible control member at the rear of the foot rest, said foot rest being thus positioned between the control members and forming a fulcrum for a foot resting thereon whereby the latter upon rocking movement in either direction will engage one and disengage the other of said control members.

2. A foot control device for automobiles including a foot rest, a brake pedal forwardly of the foot rest to be engaged by the toe of a foot on the rest, and an accelerator pedal at the rear of the foot rest to be engaged by the heel of a foot on the rest, said rest normally forming a fulcrum for the foot at its arch whereby the foot may be rocked into engagement with either the brake pedal or accelerator and at the same time shifted away from the other and whereby the foot may be shifted forwardly in an emergency, free of the accelerator pedal, to bring its full natural force into action against the brake pedal.

HARRY E. HULL.